(12) United States Patent
Toyoda (10) Patent No.: US 6,452,348 B1
(45) Date of Patent: Sep. 17, 2002

(54) ROBOT CONTROL DEVICE, ROBOT CONTROL METHOD AND STORAGE MEDIUM

(75) Inventor: Takashi Toyoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/724,988

(22) Filed: Nov. 28, 2000

(30) Foreign Application Priority Data

Nov. 30, 1999 (JP) .......................................... 11-340466

(51) Int. Cl.[7] ................................................ H02K 7/14
(52) U.S. Cl. ........................... 318/3; 318/632; 700/259; 434/308
(58) Field of Search ..................... 318/3, 632; 446/268, 446/279, 280, 298, 299, 330; 381/110; 700/258, 259; 901/46, 47; 434/308; 463/35, 39

(56) References Cited

U.S. PATENT DOCUMENTS

| | | | | |
|---|---|---|---|---|
| 4,717,364 A | * | 1/1988 | Furukawa | 446/175 |
| 5,493,185 A | * | 2/1996 | Mohr et al. | 318/3 |
| 5,832,189 A | * | 11/1998 | Tow | 901/47 |
| 6,160,986 A | * | 12/2000 | Gabai et al. | 434/308 |

* cited by examiner

*Primary Examiner*—Khanh Dang
(74) *Attorney, Agent, or Firm*—Frommer Lawrence & Haug LLP; William S. Frommer; Gordon Kessler (57) ABSTRACT

A robot control device for controlling a robot having a substantial entertainment value is disclosed. A sensor signal processor recognizes the voice of a user, sets an association between the voice recognition result and an action of the robot, and registers the association in a behavior association table of a behavior association table memory. A behavior decision unit decides which action for the robot to take based on the behavior association table.

8 Claims, 9 Drawing Sheets

| BEHAVIOR WORDS | WALKING FORWARD | LOOKING UP | BITING | ..... | HAND-SHAKING | ..... |
|---|---|---|---|---|---|---|
| HEY | 10 | 0 | 20 | ..... | 0 | ..... |
| COME HERE | 60 | 0 | 0 | ..... | 0 | ..... |
| SHAKE HANDS | 0 | 20 | 0 | ..... | 70 | ..... |
| ⋮ | ⋮ | ⋮ | ⋮ | ⋮ | ⋮ | ⋮ |

ROBOT CONTROL DEVICE, ROBOT CONTROL METHOD AND STORAGE MEDIUM

BACKGROUND OF THE INVENTION

1. Field of the Invention

The present invention relates to a robot control device, a robot control method, and a storage medium, and, more particularly, to a robot control device and a robot control method for controlling a robot with which an individual enjoys a training process like training an actual pet, such as a dog or cat, and to a storage medium for storing a software program for the robot control method.

2. Description of the Related Art

Commercially available are a number of (stuffed) toy robots which act in response to the pressing of a touch switch or a voice of an individual having an intensity above a predetermined level. In the context of the present invention, the toy robots include stuffed toy robots.

In such conventional robots, the relationship between the pressing of the touch switch or the input of the voice and the action (behavior) of the robot is fixed, and a user cannot modify the behavior of the robot to the user's preference. The robot merely repeats the same action for several times, and the user may grow tired of the toy. The user thus cannot enjoy a learning process of the robot in the same way as a dog or cat may learn tricks.

SUMMARY OF THE INVENTION

Accordingly, it is an object of the present invention to provide a robot which offers substantial entertainment value.

An aspect of the present invention relates to a robot control device for controlling the action of a robot, and includes a voice recognition unit for recognizing a voice, a control unit for controlling a drive unit that drives the robot for action, and a setting unit for setting an association between the voice recognition result provided by the voice recognition unit and the behavior of the robot.

The control unit may decide an action for the robot to take, and controls the drive unit to drive the robot to perform the decided action, wherein the setting unit sets an association between the decided action and the voice recognition result immediately subsequent to the decided action taken by the robot.

The robot control device preferably includes an assessment unit for assessing a voice recognition result obtained subsequent to the first voice recognition result provided by the voice recognition unit, wherein the control unit controls the drive unit to drive the robot to perform a predetermined action in response to the first voice recognition result, and wherein the setting unit sets an association between the predetermined action and the first voice recognition result in accordance with the assessment result of the next voice recognition result.

The setting unit preferably registers an association between the voice recognition result and the action of the robot in an association table that associates a word, which the voice recognition unit receives for voice recognition, with the action of the robot.

When the voice recognition result provided by the voice recognition unit indicates that the word is an unknown one, the setting unit preferably registers the unknown word in the association table, and preferably registers an association between the registered unknown word and the action of the robot.

Preferably, the robot control device further includes a posture detector for detecting a posture of the robot, wherein the setting unit sets an association between the voice recognition result of the voice recognition unit and an action which the robot needs to take to reach the posture detected by the posture detector.

Preferably, the control unit controls the drive unit in accordance with the association set between the action of the robot and the voice recognition result of the voice recognition unit.

Another aspect of the present invention relates to a robot control method for controlling the action of a robot, and includes a voice recognition step of recognizing a voice, a control step of controlling a drive unit that drives the robot for action, and a setting step of setting an association between the voice recognition result provided in the voice recognition step and the action of the robot.

Yet another aspect of the present invention relates to a storage medium for storing a computer-executable code for controlling the action of a robot, and the computer-executable code performs a voice recognition step of recognizing a voice, a control step of controlling drive unit that drives the robot for action, and a setting step of setting an association between the voice recognition result provided in the voice recognition step and the action of the robot.

In accordance with the present invention, the drive unit is control to drive the robot for action while the voice is being recognized, and an association is set between the voice recognition result and the behavior of the robot.

DESCRIPTION OF THE PREFERRED EMBODIMENTS

Figure 1:
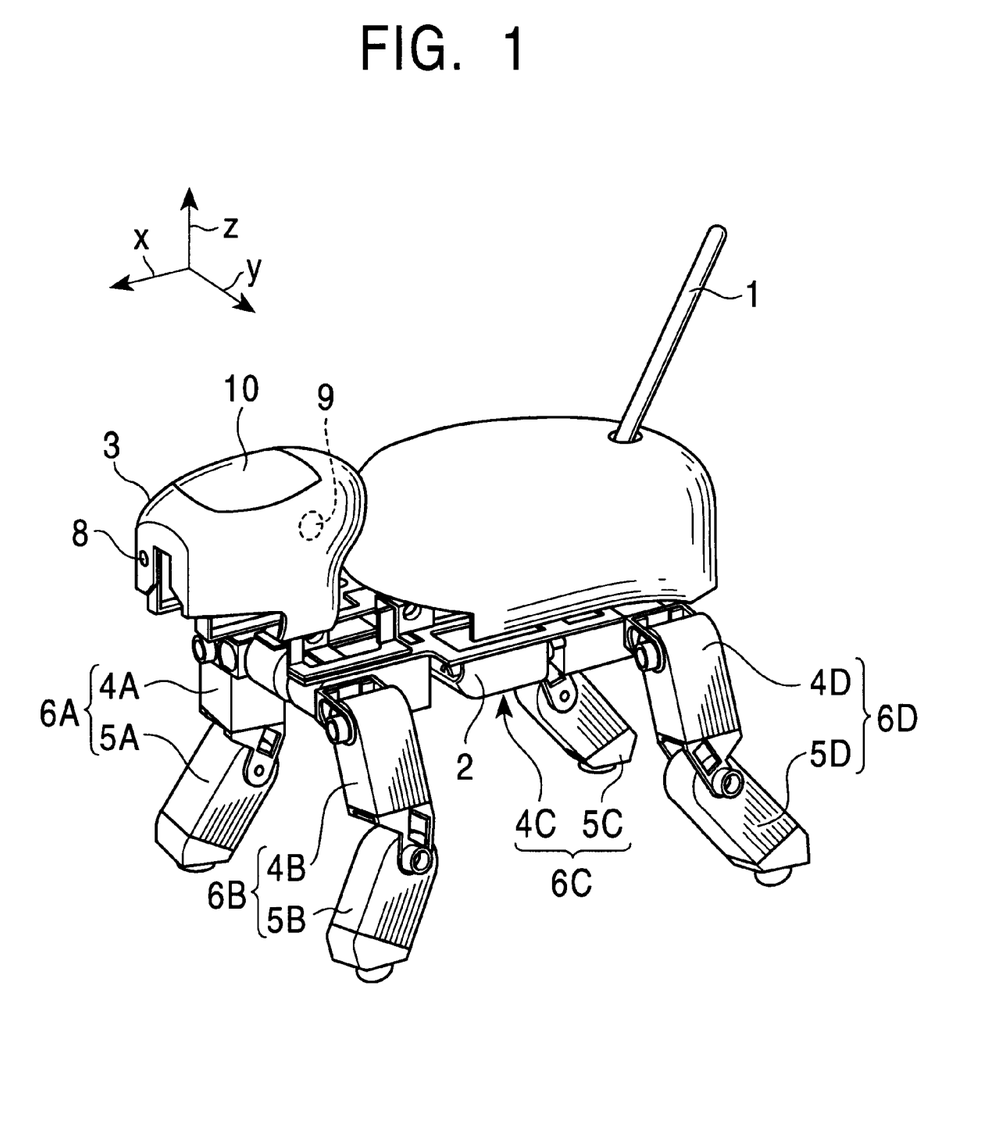
FIG. 1 is an external perspective view showing one embodiment of the robot of the present invention.
Figure 2:
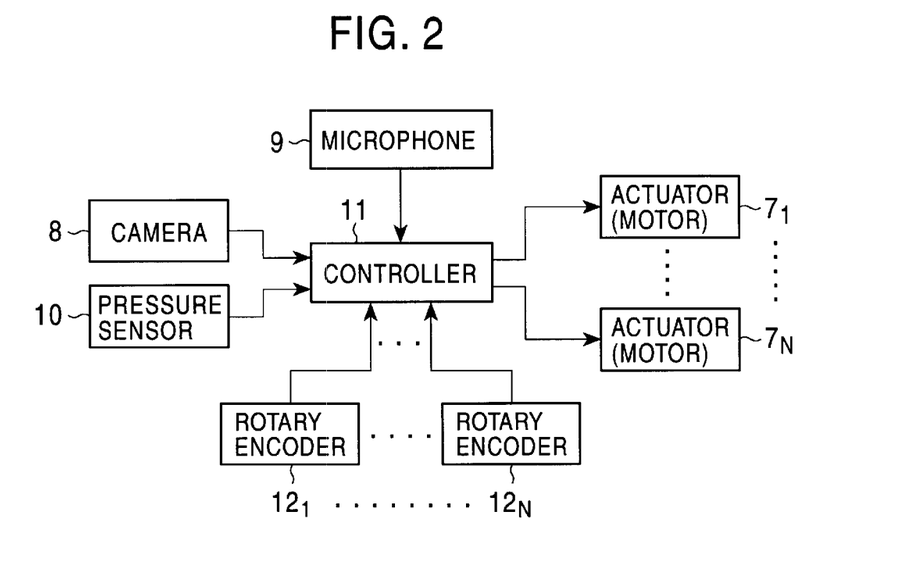
FIG. 2 is a block diagram showing the internal construction of the robot.

FIG. 1 is an external perspective view showing one embodiment of a robot of the present invention, and FIG. 2 shows an electrical construction of the robot.

In this embodiment, the robot models a dog. A head unit 3 is connected to a torso unit 2 at the forward end thereof, and foot units 6A and 6B are respectively composed of thighs 4A–4D and heels 5A–5D, and are respectively connected to the torso unit 2 on the side walls at the front and the back thereof. A tail 1 is connected to the back end of the torso unit 2.

Motors $7_1$, $7_2$, ... $7_N$ as actuators are respectively arranged at the joints between the tail 1 and the torso unit 2, between the head unit 3 and the torso unit 2, between each of the thighs 4A–4D and the torso unit 2, and between the thighs 4A–4D and the respective heels 5A–5D. With the motors $7_1$, $7_2$, ... $7_N$ turning, the tail 1 and the head unit 3 are rotated about each of the three axes, i.e., the x, y, and z axes, the thighs 4A–4D are rotated about each of the two axes, i.e., the x and y axes, the heels 5A–5D are rotated about the single axis, i.e., the x axis. In this way, the robot takes a variety of actions.

The head unit 3 contains a CCD (Charge-Coupled Device) camera 8, a microphone 9, and a pressure sensor 10 at the predetermined positions thereof. The torso unit 2 houses a controller 11. The CCD camera 8 picks up a picture of the surroundings of the robot, including the user. The microphone 9 picks up ambient sounds including the voice of the user. The pressure sensor 10 detects pressure applied the head unit 3 by the user or other objects. The controller 11 thus receives the image of the surroundings taken by the CCD camera 8, the ambient sound picked up by the microphone 9, pressure applied on the head unit 3 by the user, as image data, sound data, and pressure data, respectively.

Rotary encoders $12_1$, $12_2$, ... $12_N$ are respectively arranged for the motors $7_1$, $7_2$, ... $7_N$ at the respective articulation points. The rotary encoders $12_1$, $12_2$, ... $12_N$ respectively detect the angles of rotation of the rotary shafts of the respective motors $7_1$, $7_2$, ... $7_N$. The angles of rotation detected by the rotary encoders $12_1$, $12_2$, ..., $12_N$ are fed to the controller 11 as detected angle data.

The controller 11 determines the posture thereof and the situation surrounding the robot based on the image data from the CCD camera 8, the sound data from the microphone 9, the pressure data from the pressure sensor 10, and the angle data from the rotary encoders $12_1$, $12_2$, ... $12_N$. The controller 11 decides a subsequent action to take next in accordance with a preinstalled control program. Based on the decision, any of the motors $7_1$, $7_2$, ... $7_N$ is driven as required.

The robot thus acts in a self-controlled fashion by moving the tail 1, the torso unit 2, and the foot units 6A–6D to a desired state.

Figure 3:
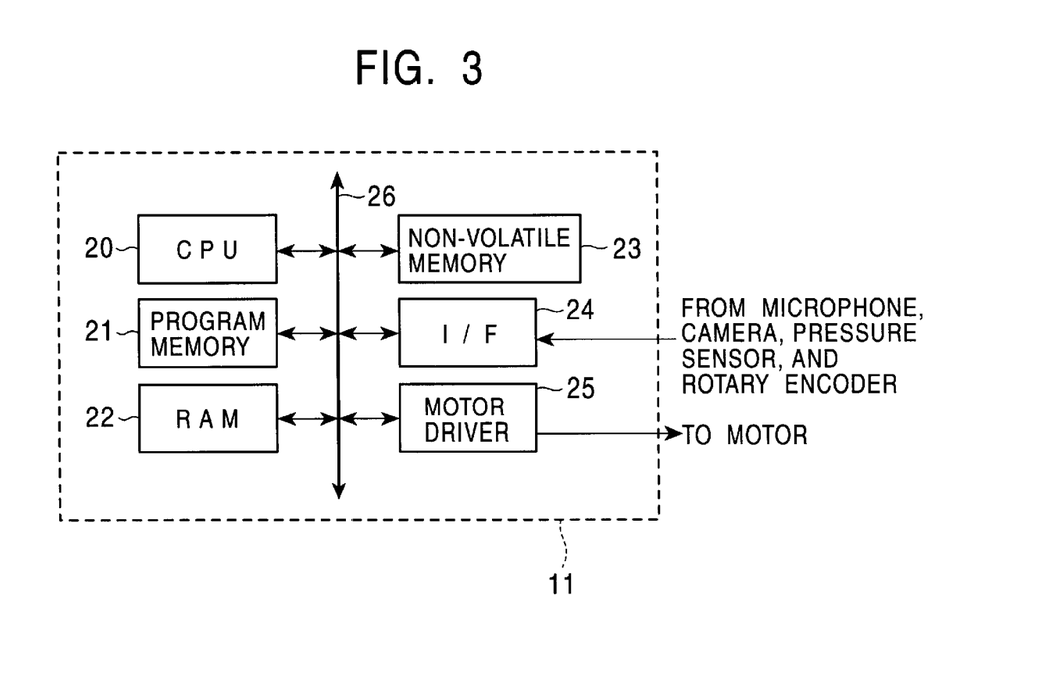
FIG. 3 is a block diagram showing the hardware construction of a controller.

FIG. 3 shows the construction of the controller 11 of FIG. 2.

The controller 11 includes a CPU (Central Processing Unit) 20, program memory 21, RAM (Random Access Memory) 22, non-volatile memory 23, interface circuit (I/F) 24, and motor driver 25. All of these components are interconnected via a bus 26.

The CPU 20 controls the behavior of the robot by executing a control program stored in the program memory 21. The program memory 21 is an EEPROM (Electrically Erasable Programmable Read Only Memory), and stores the control program executed by the CPU 20 and required data. The RAM 22 temporarily stores data needed by the CPU 20 in operation. The non-volatile memory 23, as will be discussed later, stores an emotion/instinct model, a behavioral model, a behavior association table, etc, which must be retained throughout power interruptions. The interface circuit 24 receives data supplied by the CCD camera 8, the microphone 9, the pressure sensor 10, and the rotary encoders $12_1$ through $12_N$, and sends the data to the CPU 20. Under the control of the CPU 20, the motor driver 25 feeds, to the motors $7_1$ through $7_N$, drive signals to drive these motors.

Figure 4:
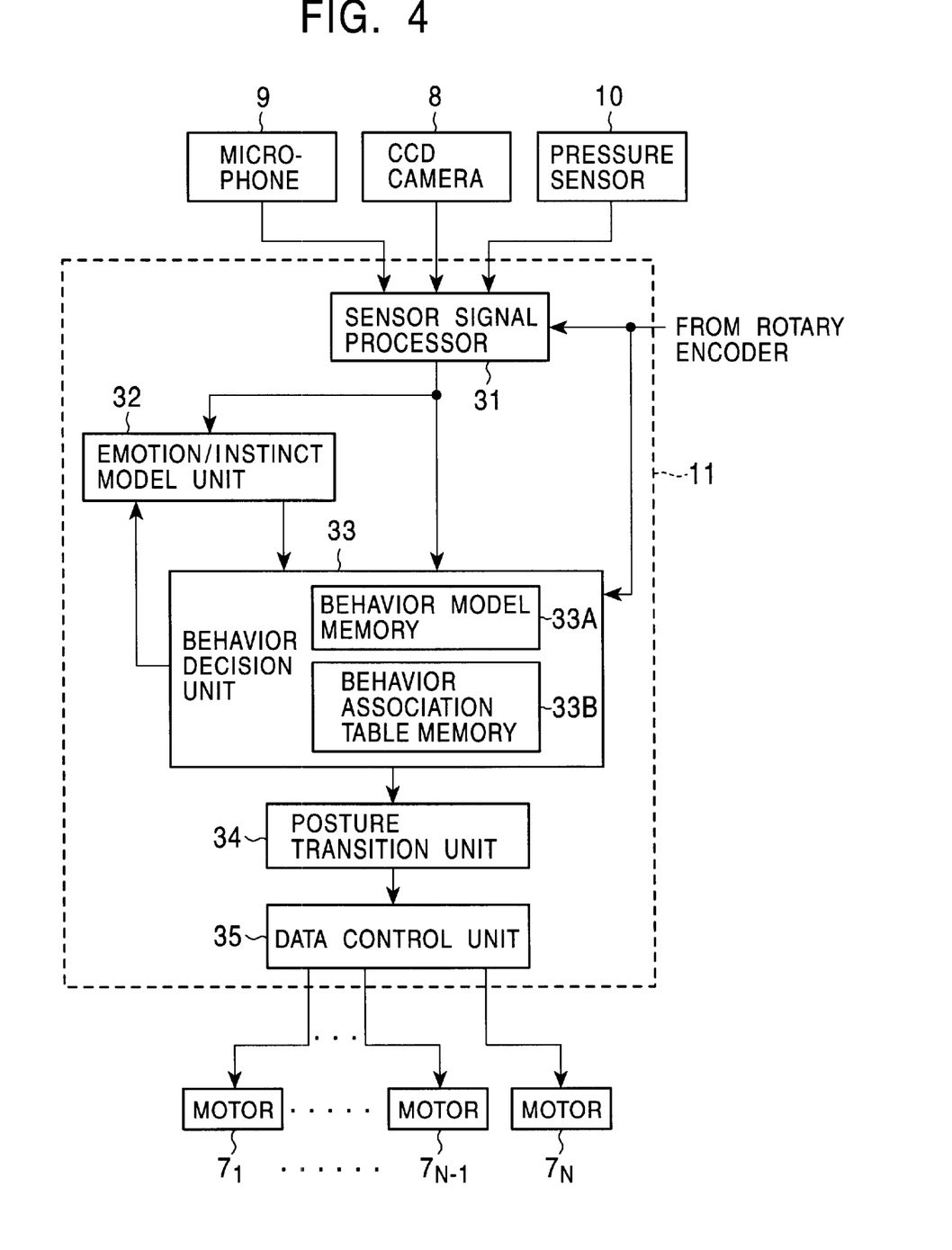
FIG. 4 is a functional block diagram that is performed when the controller executes programs.

The CPU 20 in the controller 11 controls the robot in accordance with a functional block diagram shown in FIG. 4, by executing the control program stored in the program memory 21.

FIG. 4 thus illustrates the function of the controller 11.

A sensor signal processor 31 recognizes external stimulation acting on the robot or the surroundings of the robot, and feeds these data of the external stimulation and the surroundings to an emotion/instinct model unit 32 and a behavior decision unit 33.

The emotion/instinct model unit 32 manages an emotion model and an instinct model respectively expressing the state of the emotion and the instinct of the robot. In response to the output from the sensor signal processor 31, and the output of the behavior decision unit 33, the emotion/instinct model unit 32 modifies parameters defining the emotion model and the instinct model, thereby updating the state of the emotion and the instinct of the robot.

The behavior decision unit 33 contains a behavior model memory 33A and a behavior association table memory 33B, and decides a next behavior to be taken by the robot based on the content of the memory, the output of the sensor signal processor 31, and the emotion model and the instinct model managed by the emotion/instinct model unit 32. The behavior decision unit 33 then feeds the information of the behavior (hereinafter referred to as behavior information) to a posture transition unit 34.

In order to cause the robot to behave in accordance with the behavior information supplied by the behavior decision unit 33, the posture transition unit 34 calculates control data, such as angles of rotation and rotational speeds of the motors $7_1$ through $7_N$ and outputs the control data to a data control unit 35.

The data control unit 35 drives the motors $7_1$ through $7_N$ in response to the control data coming from the posture transition unit 34.

The sensor signal processor 31 in the controller 11 thus constructed recognizes a particular external state, a particular action taken by the user, and an instruction given by the user based on the image data supplied by the camera 8, the voice data provided by the microphone 9, and the pressure data output by the pressure sensor 10. The recognition result is then output to the emotion/instinct model unit 32 and the behavior decision unit 33.

The sensor signal processor 31 performs image recognition based on the image data provided by the camera 8. For example, the sensor signal processor 31 recognizes that there is a pole or a wall, and then feeds the recognition result to the emotion/instinct model unit 32 and the behavior decision unit 33. The sensor signal processor 31 performs voice recognition by processing the voice data from the pressure sensor 10. For example, when the pressure sensor 10 detects a pressure of short duration of time at a level higher than a predetermined threshold, the sensor signal processor 31 recognizes that the robot is being "beaten or chastised". When the pressure sensor detects a pressure of long duration of time at a level lower than a predetermined threshold, the sensor signal processor 31 recognizes as being "stroked or praised". The sensor signal processor 31 then feeds the recognition result to the emotion/instinct model unit 32 and the behavior decision unit 33.

The emotion/instinct model unit 32 manages the emotion m model expressing emotional states, such as such as "joy", "sadness", "anger", etc., and the instinct model expressing "appetite", "sleepiness", "exercise", etc.

The emotion model and the instinct model express the states of the emotion and instinct of the robot by integer numbers ranging from zero to 100, for example. The emotion/instinct model unit 32 updates the values of the emotion model and instinct model in response to the output of the sensor signal processor 31, and the output of the behavior decision unit 33 with a time elapse taken into considered. The emotion/instinct model unit 32 feeds the values of the updated emotion model and instinct model (the states of the emotion and the instinct of the robot) to the behavior decision unit 33.

The states of the emotion and instinct of the robot change in response to the output of the behavior decision unit 33 as discussed below, for example.

The behavior decision unit 33 supplies the emotion/instinct model unit 32 with the behavior information of the behavior the robot took in the past or is currently taking (for example, "the robot looked away or is looking away").

Now, when the robot already in anger is stimulated by the user, the robot may take an action of "looking away" in response. In this case, the behavior decision unit 33 supplies the emotion/instinct model unit 32 with the behavior information of "looking away".

Generally speaking, an action of expressing discontent in anger, such as the action of looking away, may somewhat calm down anger. The emotion/instinct model unit 32 then decreases the value of the emotion model representing "anger" (down to a smaller degree of anger) when the behavior information of "looking away" is received from the behavior decision unit 33.

The behavior decision unit 33 decides a next action to take based on the recognition result of the sensor signal processor 31, the output of the emotion/instinct model unit 32, elapsed time, the memory content of the behavior model memory 33A, and the memory content of the behavior association table memory 33B. The behavior decision unit 33 then feeds the behavior information, representing the action, to the emotion/instinct model unit 32 and the posture transition unit 34.

The behavior model memory 33A stores a behavioral model that defines the behavior of the robot. The behavior association table memory 33B stores an association table that associates the voice recognition result of the voice input to the microphone 9 with the behavior of the robot.

Figure 5:
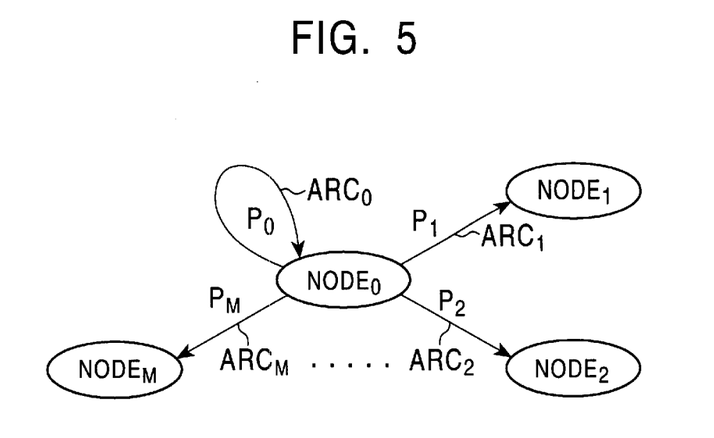
FIG. 5 shows a stochastic automaton as a behavioral model.

The behavioral model is formed of a stochastic automaton shown in FIG. 5. In the stochastic automaton shown here, a behavior is expressed by any node (state) among $NODE_0$ through $NODE_M$, and a transition of behavior is expressed by an arc $ARC_{ml}$ representing a transition from a node $NODE_{m0}$ to another node $NODE_{ml}$ (note that there is a case when another node is the original node) (m0, ml=0, 1, ..., M).

The arc $ARC_{ml}$, representing the transition from the node $NODE_{m0}$ to the node $NODE_{ml}$, has a transition probability $P_{ml}$, and the probability of node transition, namely, the transition of behavior is determined, in principle, based on the corresponding transition probability.

Referring to FIG. 5, for simplicity, the stochastic automaton having (M+1) nodes includes arcs $ARC_0$ through $ARC_M$ respectively extending from node $NODE_0$ the other nodes $NODE_0$ through $NODE_M$.

Figure 6:
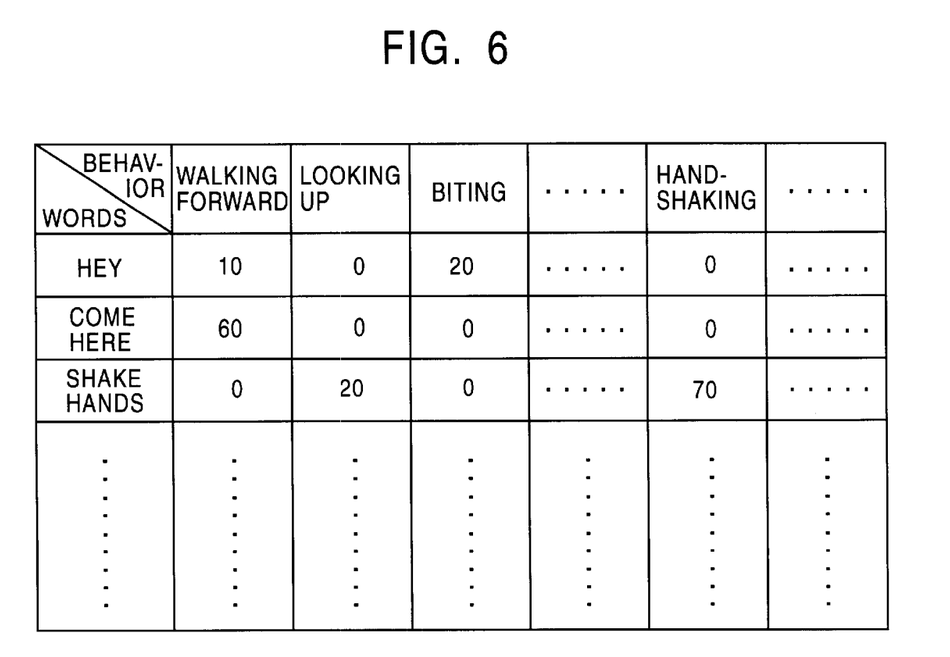
FIG. 6 shows a behavior association table.

As shown in FIG. 6, the behavior association table registers the association between each word obtained as a result of voice recognition and an action to be taken by the robot. The table shown in FIG. 6 lists, as a correlation score of an integer number, the association between a voice recognition result and a behavior. Specifically, the integer number representing the degree of association between the voice recognition result and the behavior is the correlation score. When a voice recognition result is obtained, the robot changes the probability or the degree of frequency of a behavior depending on the correlation score.

When the voice recognition result is "Hey" in the behavior association table in FIG. 6, the degrees of frequency of actions of "walking forward" and "biting" (each having no zero correlation scores) taken by the robot are respectively increased by correlation scores of 10 and 20. When the voice recognition result is "come over here", the degree of frequency of the action of "walking forward" (having no zero correlation score) taken by the robot is increased by a correlation score of 60. When the voice recognition result is "Shake hands", the degree of frequency of the action of "looking up" (having no zero correlation score) taken by the robot is increased by a correlation score of 20, and at the same time, the degree of frequency of the action of "shaking hands" is increased by a correlation score of 70.

The behavior decision unit 33, in principle, determines which node to transition to from a node corresponding to a current behavior in the stochastic automaton as a behavioral model (see FIG. 5), based on the values of the emotion model and instinct model of the emotion/instinct model unit 32, elapsed time, the recognition result of the sensor signals provided by the sensor signal processor 31, besides the transition probability set for the arc extending from the current node. The behavior decision unit 33 then supplies the emotion/instinct model unit 32 and posture transition unit 34 with the behavior information representing the behavior corresponding to the node subsequent to the node transition (also referred to as a post-node-transition action).

Depending on the values of the emotion model and instinct model, the behavior decision unit 33 transitions to a different node even if the sensor signal processor 31 outputs the same external recognition results.

Specifically, now, the output of the sensor signal processor 31 indicates that the palm of a hand is stretched out in front of the robot. When the emotion model of "anger" indicates that the robot is "not angry" and when the instinct model of "appetite" indicates that the robot is not hungry, the behavior decision unit 33 decides to drive the robot to shake hands as a post-node-transition action, in response to the stretched palm.

Similarly, the output of the sensor signal processor 31 now indicates that the palm of the hand is stretched out in front of the robot. Although the emotion model of "anger" indicates that the robot is "not angry" but the instinct model of "appetite" indicates that the robot is hungry, the behavior decision unit 33 decides to lick at the palm of the hand as a post-node-transition action.

Again, the output of the sensor signal processor 31 now indicates that the palm of the hand is stretched out in front of the robot. When the emotion model of "anger" indicates that the robot is "angry", the behavior decision unit 33 decides to drive the robot to abruptly look away, as a post-node-transition action, regardless of the value of the instinct model of "appetite".

When the recognition result of the sensor output provided by the sensor signal processor 31 determines that the voice is a user's own voice, the behavior decision unit 33 determines which node to transition to from the node for the current behavior, based on the correlation scores of the behaviors indicated by the voice recognition result, registered in the behavior association table (see FIG. 6) in the behavior association table memory 33B. The behavior decision unit 33 then supplies the emotion/instinct model unit 32 and the posture transition unit 34 with the behavior information indicating the behavior (post-node-transition action) corresponding to the decided node. In this way, the robot behaves differently dependent on the correlation scores of the behaviors in accordance with the voice recognition result.

Upon receiving a predetermined trigger, the behavior decision unit 33 transitions to a node in the behavior model, thereby deciding a post-node-transition action to take. Specifically, the behavior decision unit 33 decides a post-node-transition action to take, when a predetermined time has elapsed since the robot started the current action, when the sensor signal processor 31 outputs a particular recognition result such as a voice recognition result, or when the value of each of the emotion model or the instinct model of the emotion/instinct model unit 32 rises above a predetermined threshold.

Based on the behavior information provided by the behavior decision unit 33, the posture transition unit 34 generates posture transition information for transitioning from a current posture to a next posture, and outputs the posture transition information to the data control unit 35. Specifically, the posture transition unit 34 recognizes the current posture based on the outputs from the rotary encoders $12_1$ through $12_N$, and calculates the angles of rotation and rotational speeds of the motors $7_1$ through $7_N$ for the robot to take an action (a post-node-transition action) corresponding the behavior information from the behavior decision unit 33, and then outputs as the posture transition information to the data control unit 35.

The data control unit 35 generates drive signals for driving the motors $7_1$ through $7_N$ in accordance with the posture transition information from the posture transition unit 34, and supplies the motors $7_1$ through $7_N$ with the drive signals. The robot thus takes a post-node-transition action accordingly.

Figure 7:
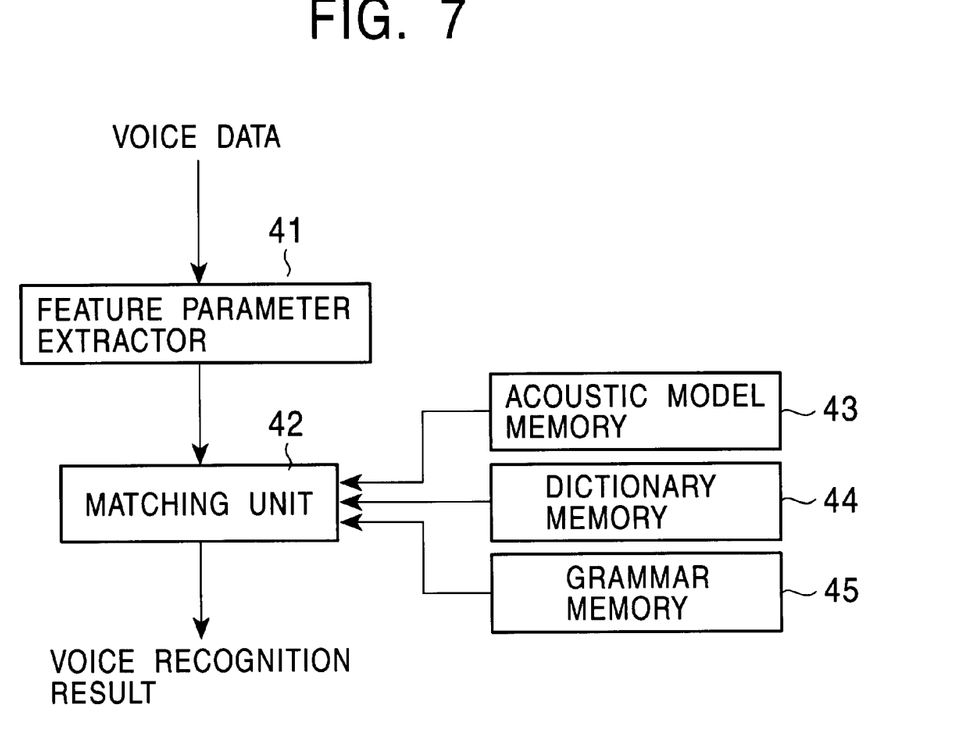
FIG. 7 is a block diagram showing the construction of a voice recognition module that performs voice recognition in a sensor input processor.

FIG. 7 is a functional block diagram of a portion of the sensor signal processor 31 shown in FIG. 4, which is hereinafter referred to as a voice recognition module and performs voice recognition in response to voice data from the microphone 9.

The voice recognition module recognizes a voice input to the microphone 9 using a continuous HMM (Hidden Markov Model), and outputs voice recognition results.

A feature parameter extractor 41 receives the voice data from the microphone 9. The feature parameter extractor 41 performs MFCC (Mel Frequency Cepstrum Coefficient) analysis on the voice data input thereto on a frame by frame basis. The MFCC analysis result is output to a matching unit 42 as a feature parameter (feature vector). As feature parameters, the feature parameter extractor 41 may further extract a linear prediction coefficient, a cepstrum coefficient, a line spectrum pair, and power in every predetermined frequency band (output of a filter bank).

Using the feature parameters from the feature parameter extractor 41, the matching unit 42 recognizes the voice input to the microphone 9 based on the continuous HMM model while referencing an acoustic model memory 43, a dictionary memory 44, and a grammar memory 45 as necessary.

The acoustic model memory 43 stores an acoustic model that represents an acoustic feature such as phonemes and syllables in a voice to be recognized. Since voice recognition is here carried out using the continuous HMM, an HMM is employed. The dictionary memory 44 stores a dictionary of words which contains information of the pronunciation (phonological information) of each word to be recognized. The grammar memory 45 stores a grammar which describes how each word registered in the data control unit 35 is chained. The grammar may be a context-free grammar, or a rule based on word chain probability (N-gram).

The matching unit 42 produces an acoustic model of a word (a word model) by connecting acoustic models stored in the dictionary memory 44 through referencing the dictionary in the dictionary memory 44. The matching unit 42 further connects several word models by referencing the grammar stored in the grammar memory 45, and processes the connected word models through the continuous HMM method based on the feature parameters, thereby recognizing the voice input to the microphone 9. Specifically, the matching unit 42 detects a word model having the highest score (likelihood) from the time-series feature parameters output by the feature parameter extractor 41, and outputs a word (a word chain) corresponding to the word model. The voice recognition result of the matching unit 42 is thus output to the emotion/instinct model unit 32 and the behavior decision unit 33 as the output of the sensor signal processor 31.

Figure 8:
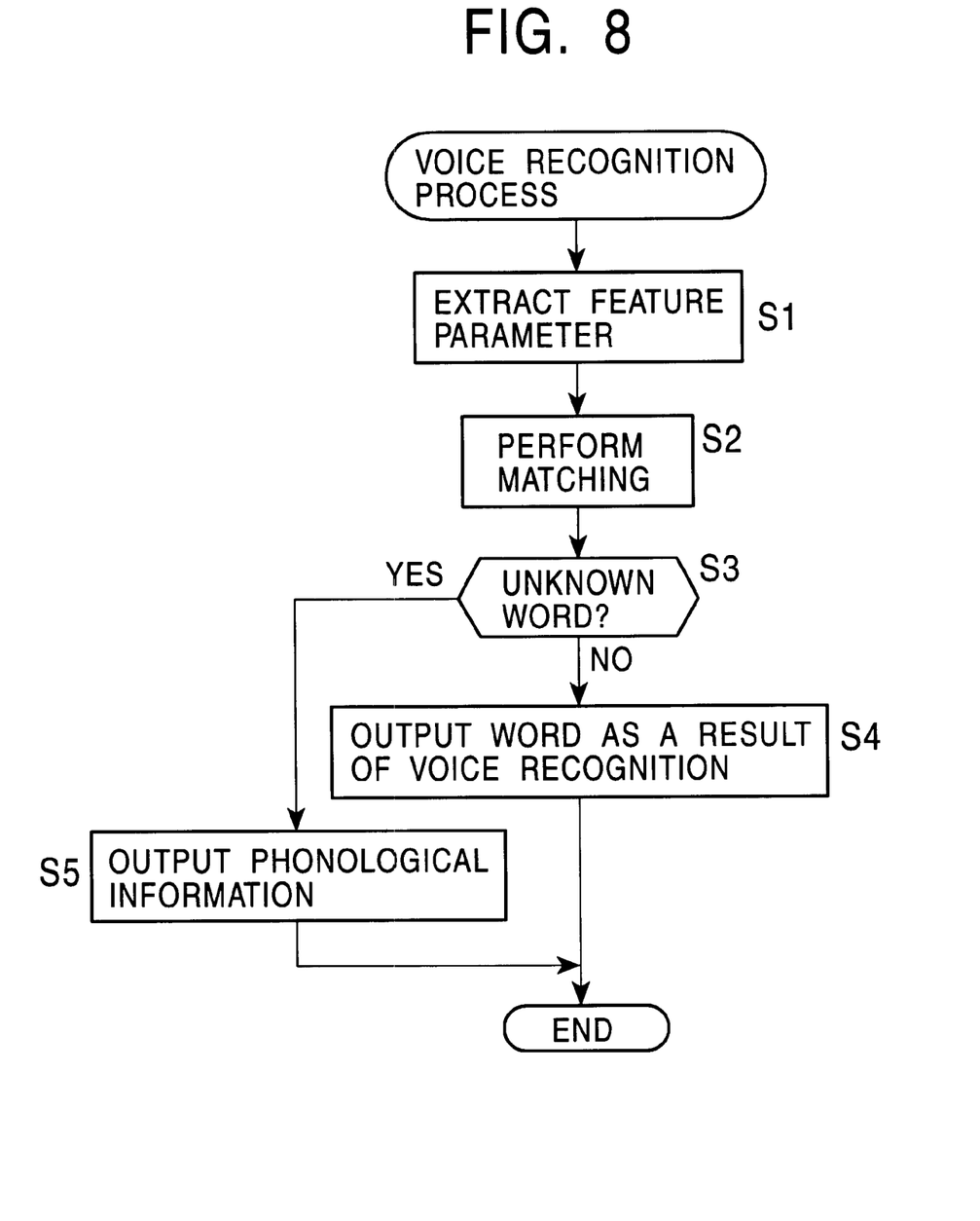
FIG. 8 is a flow diagram illustrating the operation of the voice recognition module.

The operation of the voice recognition module shown in FIG. 7 is now discussed, with reference to a flow diagram shown in FIG. 8.

The voice is now input to the microphone 9. The digital voice data responsive to the voice is fed to the sensor signal processor 31, the microphone 9. The voice data is then fed to the feature parameter extractor 41.

The feature parameter extractor 41 subjects the voice data to acoustic analysis, thereby extracting a time-series feature parameter in step S1. The feature parameter is then fed to the matching unit 42. In step S2, the matching unit 42 subjects the voice input to the microphone 9 to voice recognition through the continuous HMM method, using the feature parameter from the feature parameter extractor 41.

In step S3, the matching unit 42 determines whether the voice recognition result indicates an unknown word (an unknown word chain), namely, a word not registered in the dictionary of the dictionary memory 44. When it is determined in step S3 that the voice recognition result is a known word, in other words, when it is determined that the voice recognition result is a word registered in the dictionary, the process proceeds to step S4. The voice recognition result is then output to the emotion/instinct model unit 32 and the posture transition unit 34. The process then ends.

When it is determined in step S3 that the voice recognition result indicates an unknown word, the process proceeds to step S5. The matching unit 42 outputs a string of phonemes corresponding to the voice recognition result to the emotion/instinct model unit 32 and the behavior decision unit 33. The process then ends.

When the voice recognition result is an unknown word in this embodiment, the emotion/instinct model unit 32 simply ignores the voice recognition result. This is because the emotion/instinct model unit 32 is unable to understand the content of the voice recognition result when the voice recognition result is an unknown word.

When the voice recognition result is an unknown word, the string of the phonemes of the unknown word is registered in the dictionary of the dictionary memory 44. In this way, the unknown word, now a known word, is next subjected to voice recognition as a word registered in the dictionary.

The matching unit 42, in principle, outputs a word having the highest score as a result of the voice recognition as already discussed. When the highest score is lower than a predetermined threshold, the voice input to the microphone 9 is treated as an unknown word, and the string of phonemes corresponding to the sequence of phonological models having the highest score is output as a result of the voice recognition.

As already discussed, the behavior decision unit 33 decides a post-node-transition action taking into consideration the voice recognition result in a normal mode when the behavior decision unit 33 receives the voice recognition result from the matching unit 42. However, in a learning mode, the behavior decision unit 33 performs a behavior learning process. Specifically, the behavior decision unit 33 sets an association between the voice recognition result from the matching unit 42 and the behavior of the robot, and registers the association in the behavior association table (see FIG. 6) of the behavior association table memory 33B.

When the behavior decision unit 33 receives, from the sensor signal processor 31, a particular word (such as "learn") as a result of voice recognition or the pressure data indicating a pressure having a level higher than a predetermined value and having a duration of time longer than a predetermined time, the behavior decision unit 33 switches the operation mode from the normal mode to the learning mode for the learning mode process.

Figure 9:
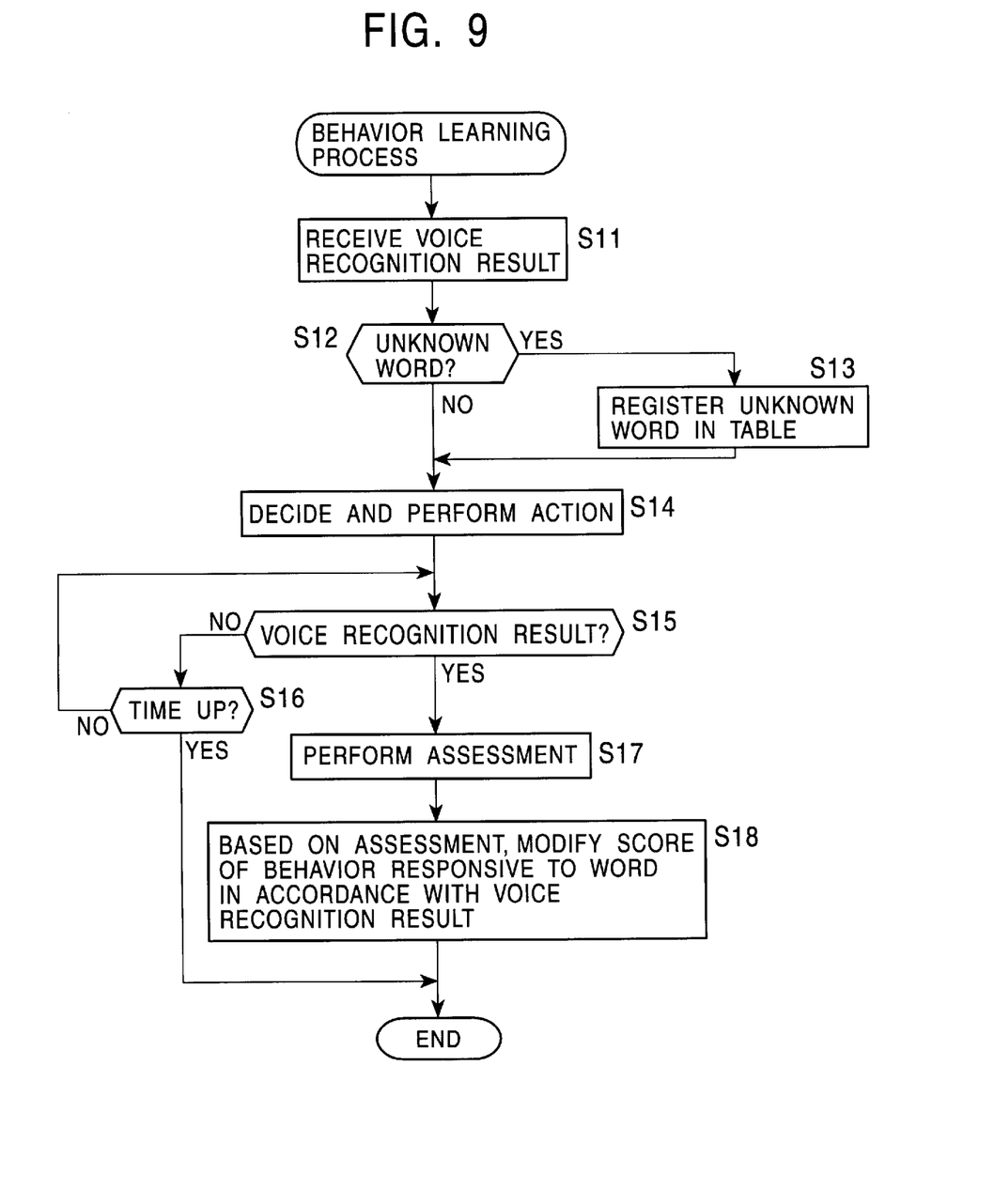
FIG. 9 is a flow diagram illustrating a first embodiment of the behavior learning process of a behavior decision unit.

FIG. 9 is a flow diagram illustrating a behavior learning process.

In the behavior learning process, the behavior decision unit 33 awaits the supply of a voice recognition result from the voice recognition module (shown in FIG. 7). When the behavior decision unit 33 receives the voice recognition result in step S11, the process proceeds to step S12. The behavior decision unit 33 determines whether the voice recognition result from the voice recognition module is an unknown word.

When it is determined in step S12 that the voice recognition result indicates an unknown word, the process proceeds to step S13. The behavior decision unit 33 adds, for registration, an entry (a row) for the unknown word in the behavior association table (see FIG. 6) of the behavior association table memory 33B (for example, adds a row for the unknown word as the lowest row in the behavior association table of FIG. 6). The process proceeds to step S14.

It is assumed that the behavior association table has the entries for all words registered in the dictionary of the dictionary memory 44 of the voice recognition module (see FIG. 7). When the voice recognition result is found to be an unknown word, the behavior association table has no entry for the voice recognition result. In step S13, then the entry of the unknown word as the voice recognition result is registered.

When it is determined in step S12 that the voice recognition result is a known word, in other words, when it is determined that the voice recognition result is any of the words registered in the behavior association table, the process proceeds to step S14, skipping step S13. The behavior decision unit 33 decides an action in a random fashion, and causes the robot to perform the post-node-transition action.

In step S15, the behavior decision unit 33 determines whether a new voice recognition result has been received from the voice recognition module. When it is determined in step S15 that no new voice recognition result has been received, the process proceeds to step S16. The behavior decision unit 33 determines whether a predetermined time has elapsed since the post-node-transition action was taken in step S14, in other words, whether time is up. When it is determined in step S16 that time is up, in other words, when the user has said no particular word since the robot took the action, the behavior learning process then ends.

Upon ending the behavior learning process, the behavior decision unit 33 switches the operation mode from the learning mode to the normal mode.

When it is determined in step S16 that the predetermined duration of time has not elapsed yet, the process returns to step S15. The voice recognition result is received. Otherwise, the process cycles through step S15 and step S16 until time is up.

When it is determined in step S15 that the new voice recognition result has been received, the process proceeds to step S17 to assess the new voice recognition result. Specifically, in step S17, the behavior decision unit 33 regards the new voice recognition result as a reaction of the user in response to the post-node-transition action taken in step S14, and thereby assesses the new voice recognition result to determine whether the voice recognition result encourages or discourages the post-node-transition action taken in step S14.

Based on the assessment result in step S17, in step S18, the behavior decision unit 33 updates (increases or decreases), in the association table, the correlation score of the word corresponding to the voice recognition result received in step S11 (hereinafter referred to as a first voice recognition result). The behavior learning process then ends.

In the behavior learning process illustrated in FIG. 9, for example, the user says "Shake hands" immediately subsequent to the switching to the learning mode, the (first) voice recognition result is fed to the behavior decision unit 33, and the action of "shaking hands" is performed as the post-node-transition action. The user encourages (praises) the action taken, for example, by speaking "Good", the (new) voice recognition result is fed to the behavior decision unit 33. The behavior decision unit 33 assesses the voice recognition result by regarding the action taken as being encouraged, and increases the correlation score of the action of "shaking hands" in response to the first voice recognition result of "Shake hands" by a predetermined value. When the user speaks "Shake hands" in the normal mode, the frequency of occurrence (probability) of the action of "shaking hands" is heightened.

Now, the post-node-transition action of "walking forward" is carried out in response to the word "Shake hands" obtained as the first voice recognition result. The user discourages the post-mode-transition action, for example, by speaking "No", and the voice recognition result in response is fed to the behavior decision unit 33. The behavior decision unit 33 assesses the voice recognition by regarding the action as being discouraged, and decreases the correlation score of the action of "walking forward" in response to the first voice recognition result of "Shake hands" by a predetermined value. When the user speaks "Shake hands" in the normal mode, the frequency of occurrence (probability) of the action of "walking forward" is therefore decreased.

The robot learns the action encouraged (praised) by the user when the user speaks, and is more likely to take the action later. In this way, the user enjoys the same training process as the one for teaching an actual pet tricks.

When the first voice recognition result is an unknown word in this embodiment, the unknown word is additionally registered in the behavior association table, and the correlation score of the action in response to the additionally registered unknown word is updated by the next voice said by the user. In this embodiment, a new word may be associated with any action. Once the new word is associated with the action thereof, the robot takes the predetermined behavior when the new word is spoken.

The post-node-transition action is decided in a random fashion in step S14 in the above discussion. However, as in the normal mode, the post-node-transition action may be decided based on the behavioral model taking into consideration the values of the emotion model and instinct model of the emotion/instinct model unit 32.

When the word as the voice recognition result received in step S11 is registered in the behavior association table, the post-node-transition action may be decided based on the correlation scores of the actions in the entries of the words. For example, the action having the highest correlation score against the word as the voice recognition result received in step S11 may be adopted as a post-node-transition action. In this case, the robot is prevented from taking an action unrelated to the voice said by the user immediately subsequent to the switching to the learning mode.

In the behavior learning process shown in FIG. 9, the robot takes any action after the user speaks a word. The user speaks a word again, and the second voice is assessed. Based on the assessment of the second voice, the correlation score of the action taken in response to the first voice is updated. The behavior learning process may be performed in a different fashion. For example, the robot takes an action, followed by a word spoken by the user in response to the action for association. The correlation score between the word and the action is accordingly updated.

Figure 10:
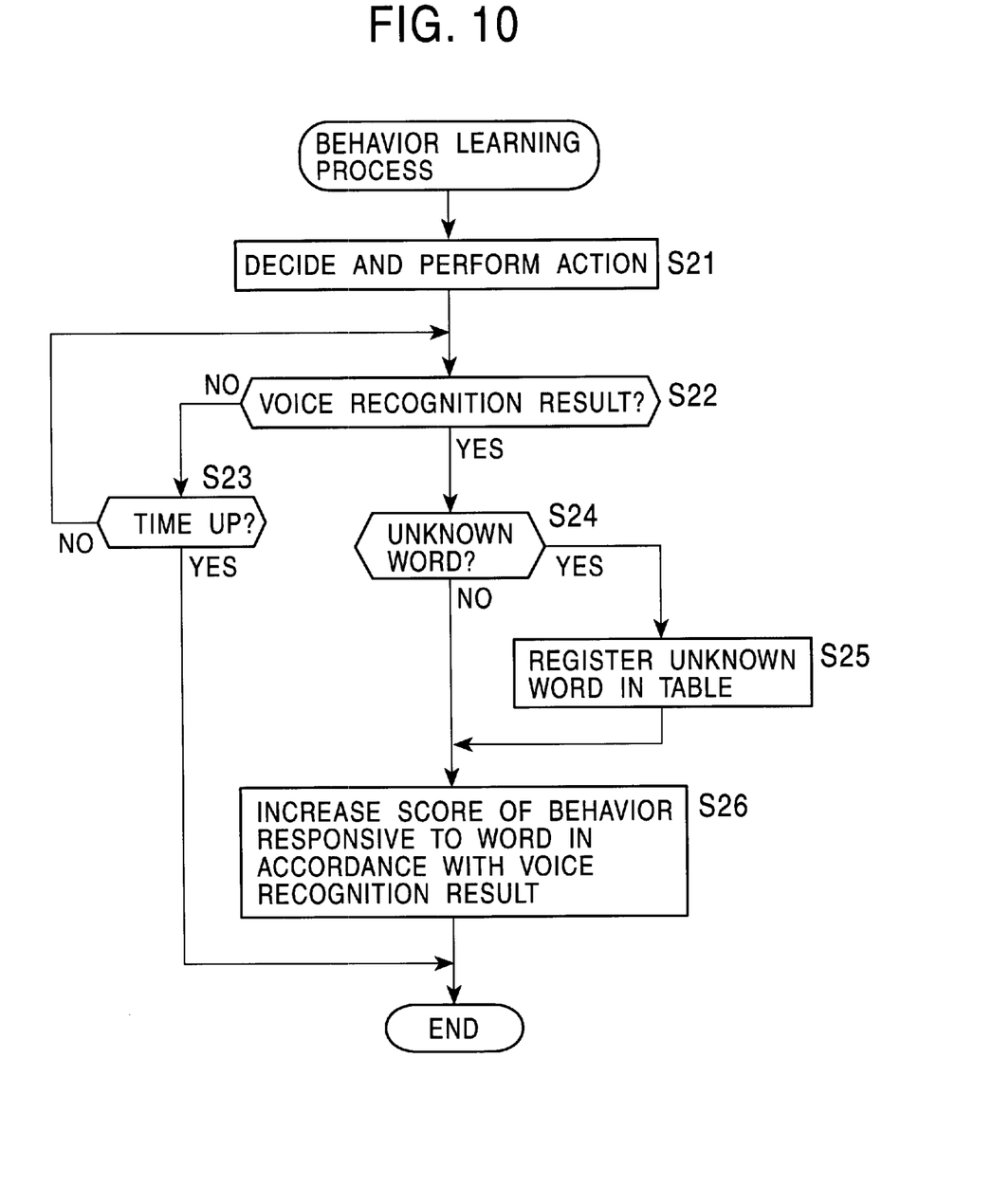
FIG. 10 is a flow diagram illustrating a second embodiment of the behavior learning process of the behavior decision unit.

Such a behavior learning process is now discussed, referring to a flow diagram shown in FIG. 10.

The behavior decision unit 33 decides the post-node-transition action in step S21 in the same way as step S14 shown in FIG. 9. The robot takes the post-node-transition action. The process then proceeds to step S22.

In step S22, the behavior decision unit 33 determines whether a voice recognition result has been received from the voice recognition module. When it is determined in step S22 that no voice recognition result has been received, the process continues at step S23. The behavior decision unit 33 determines whether a predetermined duration of time has elapsed since the post-node-transition action taken in step S21, in other words, whether time is up. When it is determined in step S23 that time is up, in other words, when the user has said no particular word since the robot took the post-node-transition action, the behavior learning process then ends.

When it is determined in step S23 that the predetermined duration of time has not elapsed yet, the process returns to step S22. The voice recognition result is received. Otherwise, the process cycles through step S22 and step S23 until time is up.

When it is determined in step S22 that a voice recognition result has been received, the process proceeds to step S24, and the behavior decision unit 33 determines whether the voice recognition result is an unknown word.

When it is determined in step S24 that the voice recognition result indicates an unknown word, the process proceeds to step S25. In the same way as in step S13 in FIG. 9, the behavior decision unit 33 adds, for registration, an entry for the unknown word in the behavior association table (see FIG. 6) of the behavior association table memory 33B. The process proceeds to step S26.

When it is determined in step S24 that the voice recognition result is a known word, in other words, when it is determined that the voice recognition result is any of the words registered in the behavior association table, the process proceeds to step S26, skipping step S25. The behavior decision unit 33 increases, in the association table, the correlation score of the word corresponding to the voice recognition result received from the voice recognition module, in response to the post-node-transition action taken in step S21, by a predetermined value. The behavior learning process then ends.

In the behavior learning process illustrated in FIG. 10, the behavior decision unit 33 decides the action of "shaking hands" as the post-node-transition action, immediately. subsequent to the switching to the learning mode, and the post-node-transition action of "shaking hands" is actually performed. The user then says "Shake hands", for example, which is desired to be associated with the action of "shaking hands", and the behavior decision unit 33 increases the correlation score of the action of "shaking hands" in association with the words "Shake hands" as a result of voice recognition, by a predetermined value. In this case, in the same way as the flow diagram shown in FIG. 9, when the user says "Shake hands" in the normal mode, the frequency of occurrence (probability) of the action of "shaking hands" is increased.

The behavior learning processes illustrated in FIG. 9 and FIG. 10 have difficulty learning an action, unregistered as a behavioral model in the behavior model memory 33A, in response to a voice pronounced by the user. If the robot learns an action, unregistered as a behavior model, in response to the voice pronounced by the user, a robot owned by an individual may have more diversity in the personality of its own, and offers more entertainment value of the robot.

Figure 11:
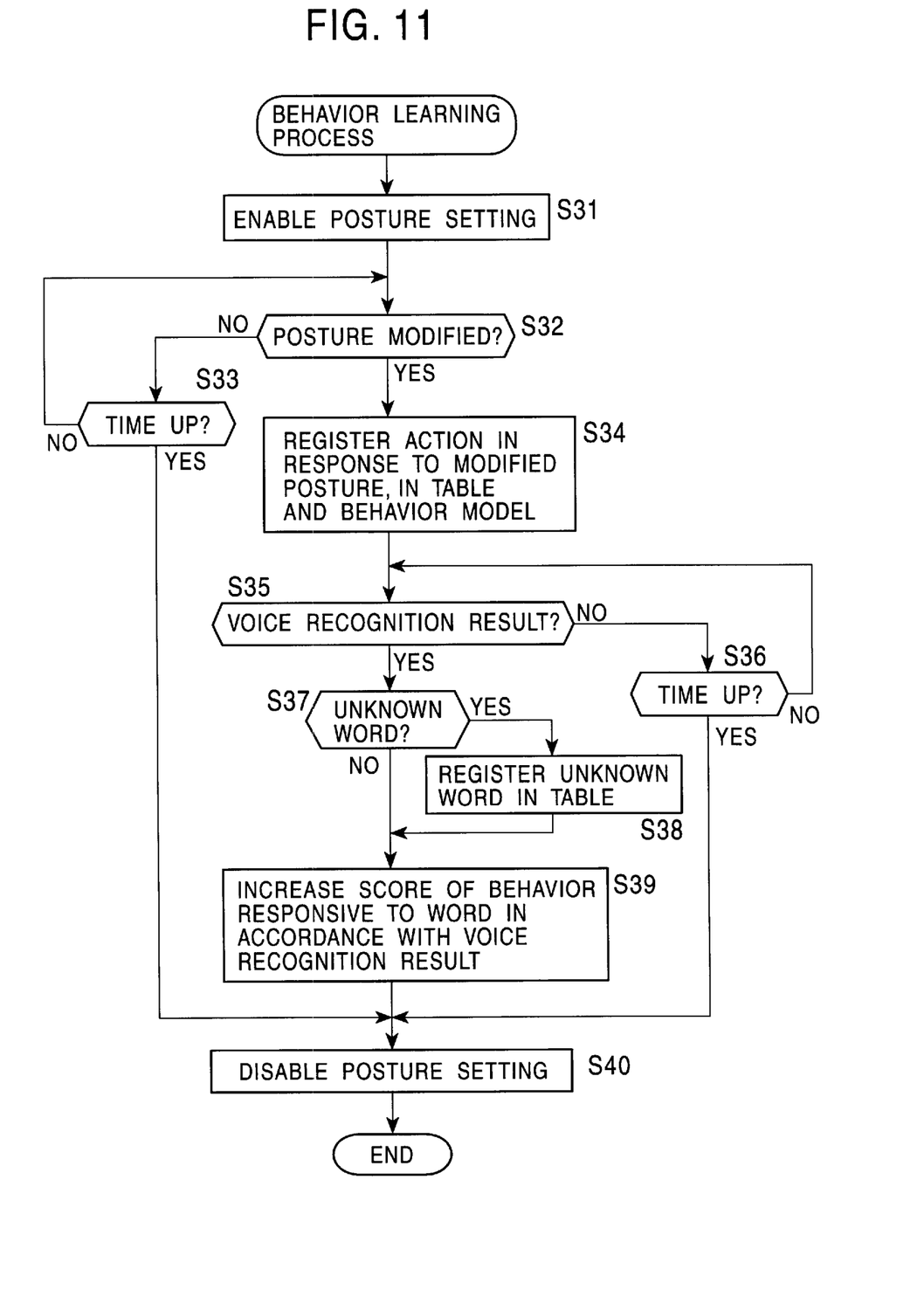
FIG. 11 is a flow diagram illustrating a third embodiment of the behavior learning process of the behavior decision unit.

The behavior learning process performed in such a manner is now discussed, with reference to a flow diagram shown in FIG. 11.

In step S31, the behavior decision unit 33 sets the motors $7_1$ through $7_N$. to be in a posture setting enable state through the posture transition unit 34 and the data control unit 35. Specifically, when an external force is applied onto the robot in step S31, the states of the motors $7_1$ through $7_N$ (the angles of rotation thereof) are modifiable (in the posture setting enable state).

In the posture setting enable state, the motors $7_1$ through $7_N$ maintain the current states at an upper torque limit. When an external force above the upper torque limit acts on the robot, the behavior decision unit 33 changes the states of the motors (i.e., allows the motors to rotate) in response to the external force.

The process then proceeds to step S32. The behavior decision unit 33 allows at least one of the motors $7_1$ through $7_N$ to rotate in response to the external force, and determines whether the robot changes the posture thereof. This determination is performed based on the outputs from the rotary encoders $12_1$ through $12_N$.

When it is determined in step S32 that the robot remains unchanged in the posture thereof, the process proceeds to step S33. The behavior decision unit 33 determines whether a predetermined duration of time has elapsed since the posture setting enable state began, in other words, whether time is up. When it is determined in step S33 that time is up, in other words, when it is determined that the user has applied no external force to the robot, the process proceeds to step S40.

When it is determined that the predetermined duration of time has not elapsed yet, the process returns to step S32, and cycles through step S32 and step S33.

When it is determined in step S32 that the robot has changed the posture thereof, the process proceeds to step S34. The behavior decision unit 33 registers a new row for an action (hereinafter referred to as a new action) for taking a posture after the posture change, in the behavior association table (see FIG. 6) of the behavior association table memory 33B. Furthermore, the behavior decision unit 33 adds a node for the new action in the behavior model (see FIG. 6) of the behavior decision unit 33, and an arc between the newly added arc and the existing node.

The process then proceeds to step S35. The behavior decision unit 33 determines whether the voice recognition result has been received from the voice recognition module. When it is determined in step S35 that no voice recognition result has been received, the process goes to step S36. The behavior decision unit 33 determines whether a predetermined duration of time has elapsed since the process step in S34, in other words, determines whether time is up. When it is determined in step S36 that time is up, in other words, when the user has spoken no particular words since the new action was registered in the behavior association table and the behavioral model, the process proceeds to step S40.

When it is determined in step S36 that the predetermined duration of time has not elapsed yet, the process returns to step S35. The voice recognition result is received. Otherwise, the process cycles through step S35 and step S36 until time is up.

When it is determined in step S35 that the voice recognition result has been received, the process proceeds to step S37. The behavior decision unit 33 determines whether the voice recognition result is an unknown word.

When it is determined in step S37 that the voice recognition result is an unknown word, the process goes to step S38. In the same way as in step S13 shown in FIG. 9, the behavior decision unit 33 additionally registers an unknown word entry in the behavior association table (see FIG. 6) of the behavior association table memory 33B. The process then proceeds to step S39.

When it is determined in step S37 that the voice recognition result is a known word, the process goes to step S39, skipping step S38. The behavior decision unit 33 increases, in the behavior association table, the correlation score of the word, corresponding to the voice recognition result from the voice recognition module, with the new action, by a predetermined value. The process then proceeds to step S40.

The posture setting state is then disabled in step S40, and the behavior learning process ends.

For example, in the behavior learning process shown in FIG. 11, the user may cause the robot to lie down in a "lying down" posture with the foot units 6A and 6B folded inwardly and the bottom of the torso unit 2 resting on the ground. The behavior decision unit 33 additionally registers a new action for taking the "lying down" posture in the behavior association table and the behavioral model. When the user says "Lie down", the behavior decision unit 33 increases the correlation score of the word "Lie down" as the voice recognition result in response to the voice of the user with the action of "lying down" by a predetermined value.

When the action of "lying down" is not registered as a behavioral model, the voice "Lie down" of the user causes the robot to take the action of "lying down". The user thus allows the user's own robot to take a diversity of actions.

The switching of the operation mode from the normal mode to the learning mode is performed in response to the above-mentioned trigger. Alternatively, the operation mode is switched by a dedicated switch arranged on the robot. Alternatively, a communications interface for infrared communication may be mounted on the robot, and a command for changing the operation mode may be transmitted from a remote control unit. The proximity of the user to the robot may be detected though electrostatic induction or electromagnetic induction means or by using a pryroelectric-effect sensor. When the user remains in the proximity to the robot for a predetermined duration of time or more, the operation mode may be switched.

To perform the behavior learning process shown in FIG. 11, the application of an external force to the motors $7_1$ through $7_N$ is detected from the output signals of the rotary encoders $12_1$ through $12_N$ or other signals (the angles of rotation of the motors $7_1$ through $7_N$, or the voltages across or the currents flowing through the motors $7_1$ through $7_N$). When the external force is continuously applied for a predetermined duration of time or more, the operation mode may be switched. In the behavior learning process shown in FIG. 11, the operation mode may be switched in response to a combination of the proximity of the user to the robot and the application of the external force.

The embodiment of the present invention have been discussed in connection with the robot for entertainment (such as the toy robot). The present invention is not limited to this type of robot, and finds many applications in a diversity of robots including industrial robots.

In the discussion of this embodiment of the present invention, the motors $7_1$ through $7_N$ are used as actuators for driving the robot. The present invention is not limited to these motors. Other actuators, a loudspeaker, a buzzer, an illumination device may be employed as long as these components cause the robot to take action.

In the discussion of this embodiment of the present invention, the CPU 20 executes the software program, thereby carrying out the series of the above-referenced process steps. The series of the above-referenced process steps may be carried out by dedicated hardware components.

The software program is pre-stored in the program memory 21 (see FIG. 3). Alternatively, the software program may be stored, temporarily or permanently, in a removable storage medium, such as floppy disk, CD-ROM (Compact Disc Read Only Memory), MO (Magneto-optical) disk, DVD (Digital Versatile Disc), magnetic disc, semiconductor memory, etc. The removable storage medium may be supplied in the form of a package software, and the software program is then installed onto the program memory 21 of the robot.

The software program is thus installed from the removable storage medium. Alternatively, the software program may be installed onto the program memory 21 from a download site via a digital broadcasting satellite in a wireless fashion or through a LAN (Local Area Network) or the Internet in a wired fashion.

When the software program is updated in version, the updated program may be easily installed onto the program memory 21.

It is not necessary that the process steps describing the software program for the CPU 20 to perform a diversity of processes be chronologically performed in the order stated in each flow diagram. Several process steps may be performed in parallel or separately (in a parallel processing or processing through object).

The software program may be executed by a single CPU or may be executed by a plurality of CPUs in distributed processing.

In accordance with the present invention, the drive unit for driving the robot is controlled while the voice of the user is recognized. The association between the voice recognition result and the behavior of the robot is thus set up. A robot taking a diversity of actions in response to the voice thus results.

What is claimed is:

1. A robot control device for controlling the action of a robot, comprising:

voice recognition means for recognizing a first voice and a second voice;

control means for controlling drive means that drives the robot for action in accordance with said first voice recognized by said voice recognition means;

setting means responsive to said voice recognition means for setting an association between the first recognized voice provided by the voice recognition means and said control means to control the action of the robot in accordance with said second recognized voice recognized by said voice recognition means after said action is performed in said robot.

2. The robot control device according to claim 1, further comprising assessment means for assessing said second voice recognized by the voice recognition means, wherein the control means controls the drive means to drive the robot to perform a predetermined action in response to said first recognized voice, and wherein the setting means sets an association between the predetermined action and the first voice recognition result in accordance with the assessment result of the second recognized voice.

3. The robot control device according to claim 1, wherein the setting means registers an association between the first recognized voice and the action of the robot in an association table that associates a word, which the voice recognition means receives for voice recognition, with the action of the robot.

4. The robot control device according to claim 3, wherein when said voice recognition means indicates that the word of said first recognized voice is an unknown one, the setting means registers the unknown word in the association table, and also registers an association between the registered unknown word and the action of the robot.

5. The robot control device according to claim 1, further comprising posture detector means for detecting a posture of the robot, wherein the setting means sets an association between the first recognized voice and an action which the robot needs to take to reach the posture detected by the posture detector means.

6. The robot control device according to claim 1, wherein the control means controls the drive means in accordance with the association set between the action of the robot and the first recognized voice.

7. A robot control method for controlling the action of a robot, comprising the steps of:

recognizing a first voice;

controlling drive means that drives the robot for action in accordance with said recognized first voice;

recognizing a second voice; and setting an association between the first recognized voice and the action of the robot in accordance with said second recognized voice.

8. A storage medium for storing a computer-executable code for controlling the action of a robot, the computer-executable code performing the steps of:

recognizing a first voice;

controlling drive means that drives the robot for action in accordance with said recognized first voice;

recognizing a second voice; and setting an association between the first recognized voice and the action of the robot in accordance with said second recognized voice.

* * * * *